Nov. 2, 1937.   C. C. BENZ   2,097,716
OIL TESTING MACHINE
Filed July 1, 1935
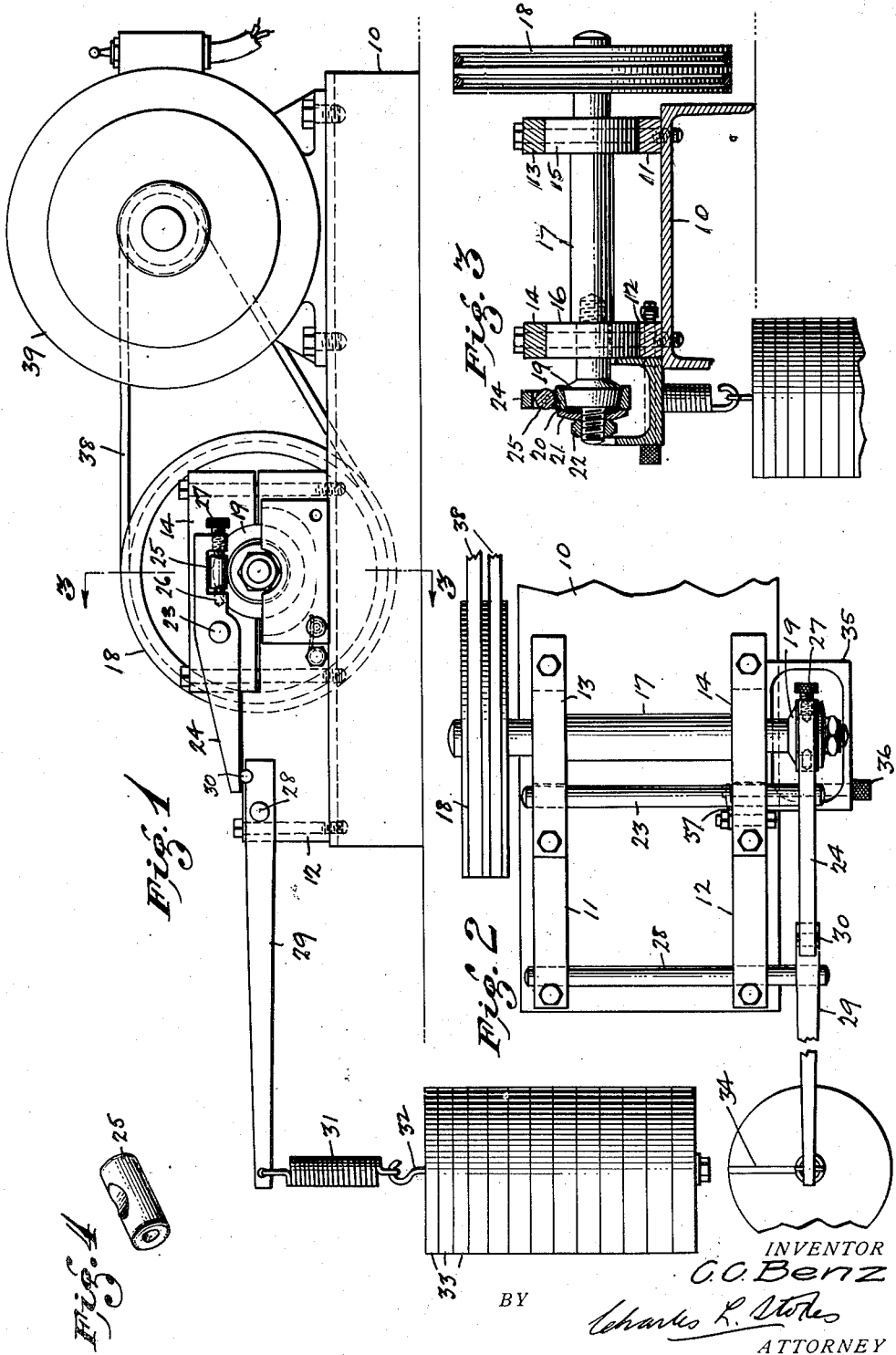
INVENTOR
C.C.Benz
BY Charles R. Stokes
ATTORNEY Patented Nov. 2, 1937

2,097,716

UNITED STATES PATENT OFFICE 2,097,716

OIL TESTING MACHINE

Cyril C. Benz, Long Beach, Calif.

Application July 1, 1935, Serial No. 29,317

1 Claim. (Cl. 265—10)

This invention relates to improvements in oil testing machines and has for its principal object the provision of mechanism whereby the frictional resistance qualities of oils, particularly lubricating oils for internal combustion engines, may be comparatively tested.

Another object is to provide an oil testing machine of such great accuracy of construction and operation that the same repeated results may be had from repeated tests on the same oil.

Another object is to provide an oil testing machine adapted to test a lubricating oil under such varying conditions of load, or bearing pressure, as to simulate actual operating conditions in an engine.

With these, and other objects, in view, one embodiment of the invention is shown in the drawing, in which:

Fig. 1 is an elevation of an oil testing machine.
Fig. 2 is a plan view of part of Fig. 1.

Fig. 3 is a transverse sectional view along the lines 3—3 of Fig. 1.

Fig. 4 is a perspective of a part of Fig. 1.

A heavy base 10, preferably made of suitable metal, has a machined smooth surface adapted to support parallel aligned lower bearing blocks 11 and 12.

Upper bearing blocks 13 and 14 are adapted to be coordinated with the lower blocks 11 and 12 respectively and so machined together as to accurately receive and hold the outer circular races 15 and 16 respectively of any well known ball bearing assembly; the whole assemblage of bearing blocks and bearings being securely held in accurate alignment on base 10 by suitable stud bolts, or otherwise.

Bearing assemblies 15 and 16 are adapted to receive, through their central inner races, the reduced ends of a drive shaft 17 to one reduced end of which is keyed a drive pulley 18 and to the other end of which is keyed a frusto-conical portion 19 forming a seat.

Frusto-conical seat 19 is accurately machined and ground to a desired taper to receive a correspondingly machined and ground bearing ring 20 having an accurately machined and ground circular peripheral surface of desired width, and said ring 20 is preferably case hardened on its peripheral surface, and accurately machined and ground on its sides.

Bearing ring 20 is adapted to be held in such tight relationship with seat 19 that it forms a practically immovable unit therewith during operation, and this is accomplished by clamping an accurately faced bearing washer 21 against the machined side of ring 20 by a lock nut 22 tightened on the threaded reduced end of shaft 17, the inner surface of washer 21 being slightly recessed to give somewhat of a slight spring action for holding nut 22.

The assembly, as above identified, thus forms a unit with drive shaft 17 which is set at right angles to the lengthwise positions of bearing blocks 11 and 12 so that the plane of rotation of bearing ring 20 will remain in the same identical plane without variation, as closely as mechanical skill can effect the same.

A rod 23 is securely held in upper bearing blocks 13 and 14, and in accurate alignment therewith at right angles thereto and parallel to shaft 17, the outer end of which pivotally supports a bearing arm 24 of such width as to support a bearing cylinder 25 in a recess at one end, and cylinder 25 is securely held in said recess at one of its ends by a point 26 and locked thereon by a thumb-screw 27. This arrangement is merely for ease of detachment of cylinder 25, which may be a cylindrical case hardened roller bearing taken from any well known roller bearing, but is preferably one of a plurality of bearings made from the same steel and case hardened under the same heat conditions to provide uniformity.

Cylinder 25 may be of other shapes, such as square, but is preferably cylindrical for ease and uniformity of manufacture, and is securely held in accurately aligned position in bearing arm 24 to contact the outer face of bearing ring 20 in constant and perfect alignment; bearing arm 24 being detachably held in well known manner on the end of rod 23 to constantly preserve the aligned contact of cylinder 25 with ring 20.

A rod 28 is securely held in lower bearing blocks 11 and 12 and adapted to support on one end a tension arm 29, detachably held thereon in well known fashion in longitudinal central alignment with arm 24 with which it is in contact at one end through a cross pin 30 of circular cross-section so as to form a line contact therewith at any operative position of the two thus contacted arms.

At the other end of tension arm 29 is hooked a spring 31 supporting a shaft 32 on which, as required, may be placed one or more weights 33, the same being put on in any well known manner as, for instance, by slipping a slot 34 around the shaft 32; the object being to provide a variable bearing pressure between the surface of cylinder 25 and ring 20 by varying the number of weights hung on shaft 32.

Surrounding the lower half of ring 20 is placed a cup 35 firmly, but detachably, held on a lower bearing block 12 as by one or more pins 36 retained at their inner ends in the block as by a hooked spring 37.

Cup 35 is machined and polished thoroughly on its interior surface and is for the purpose of holding the oil to be tested.

It is highly important in testing oils for their frictional resistance qualities that uniformity of procedure be had for each test, otherwise no accurate comparative data can be secured.

To this end, contamination of the oil under test must be prevented, vibration must be eliminated, and constant alignment with constant tension must be provided for.

These objects are attained in the present invention, wherein the machined parts of which are constructed with the very closest mechanical tolerances possible and the machine set up in the closest possible perfect alignment, vibration is practically eliminated by providing a V belt drive 38 connecting a motor 39 to pulley 18 and comprising resilient driving means, and also by the spring 31 providing a resilient contact, while contamination of the oil is prevented by first having the interior of cup 35 so polished that it may be made perfectly clean of oil from a previous test and secondly in providing that the bearing assemblies 15 and 16 are of oil tight, or grease tight, construction such as are readily available, whereby there can be no leakage of lubricant into the oil in cup 35 under test. It may be noted that motor 39 is preferably an electric motor preferably securely fixed to base 10.

All these factors are of importance in assuring uniformity of conditions for successive tests, either on the same oil or on different oils and prevention of contamination is of especial importance because, with the small amount of oil under test in cup 35, a minute quantity of contaminating oil of different characteristics is sufficient to render the test valueless.

In operation, a small quantity of the oil to be tested is placed in cup 35 so that the lower edge of ring 20 will just touch the surface of the oil therein to form a film of the oil thereon and motor 39 is started to attain and run at a predetermined constant speed.

A predetermined weight, or number of weights, is placed on shaft 32 and at a timed period (as with a stop watch) cylinder 25 is contacted with the oiled surface of ring 21 revolving at constant speed.

The run is continued under the same conditions for a predetermined period when, if deterioration of the oil in cup 35, cylinder 25, or ring 20, is not observable by sight, sound, smell or touch, a further weight is hung on shaft 32 to increase the bearing pressure between cylinder 25 and ring 21 to the end that ultimately, after a series of continued runs for predetermined time periods, there will come a time when the bearing pressure is too great for the lubricating qualities of the oil to overcome and seizure between cylinder 25 and ring 21 will start resulting in more or less scoring of the parts in contact, as illustrated in Fig. 4.

Such seizure is readily observable and, being correctly timed, the machine is stopped, the results noted, and a new cylinder 25 and ring 20 inserted for a fresh run after cup 35 has been detached and thoroughly cleaned for fresh oil.

In this manner it can be readily seen that, under the accurate and similar conditions of runs, it may be positively determined which particular type of oil will stand certain operating conditions in an engine, or elsewhere, with a certainty of performance.

It is apparent that the physical conditions of operation may be varied as, for instance, the oil in cup may be preliminarily heated to an elevated temperature above atmospheric temperature and such temperature may be maintained by maintaining a controlled flame, or heating element, underneath cup 35.

Preferably cylinder 25 is held in bearing arm 24 with its longitudinal axis at right angles to the longitudinal axis of shaft 17 so that a point contact is made between cylinder 25 and bearing ring 20.

This construction assures a minimum frictional wear, as illustrated in Fig. 4, while maintaining a substantially uniform pressure per unit area of contact as distinguished from a line contact. Further, the wear with such point contact is not accelerated as with a line contact and consequently the test may be ultimately concluded with a far greater degree of accuracy in comparison.

I claim as my invention:

An oil testing machine comprising a base, bearing assemblies fixed on the base, a drive shaft fixed in said assemblies and adapted to be rotated therein, a bearing ring fixed to one end of said shaft, a cylindrical member pivotally mounted on said base and having its longitudinal axis at right angles to the longitudinal axis of said shaft whereby a point contact is made between the peripheries of said cylindrical member and said bearing ring, means to supply a lubricant to be tested to said point contact, and means to resiliently maintain said point contact.

CYRIL C. BENZ.